Patented Jan. 2, 1951

2,536,980

UNITED STATES PATENT OFFICE 2,536,980

POLYVINYL ALCOHOL-1-BUTENE-1,3-DIONE REACTION PRODUCT AND PROCESS FOR PRODUCING THE SAME

Giffin D. Jones, Easton, Pa., assignor to General Aniline & Film Corporation, New York, N. Y., a corporation of Delaware No Drawing. Application May 2, 1947, Serial No. 745,648

4 Claims. (Cl. 260—63)

This invention relates to novel polymeric products obtained by acylating a polyvinyl alcohol with an acylating agent containing an oxocarbonyl group in the acyl residue, and a process of producing them.

I have found that by selection of the particular polyvinyl alcohol and the particular acylating agent containing an oxocarbonyl group in the acyl residue, which are employed in producing the novel polymeric products of this invention, and by control of the extent to which the polyvinyl alcohol is acylated, a wide variety of novel polymeric products having many valuable uses are readily obtained.

In practicing the present invention, the polyvinyl alcohol which is acylated with an acylating agent containing an oxocarbonyl group in the acyl residue to produce the novel products of this invention may be any polyvinyl alcohol, i. e. partially or completely hydrolyzed polyvinyl carboxylates such as polyvinyl acetate, polyvinyl propionate, polyvinyl laurate, polyvinyl stearate, polyvinyl benzoate, etc., partially or completely hydrolyzed vinyl carboxylate interpolymers such as vinyl chloride-vinyl acetate interpolymers, vinyl acetate-vinyl butyrate interpolymers, ethylene-vinyl acetate interpolymers, etc. While new and useful products are obtainable when any polyvinyl alcohol is employed in practicing the process of this invention, I have found that particularly valuable materials which have the property of forming thermo-reversible gels when treated with a polyhydrazide are obtained when a water-soluble polyvinyl alcohol is employed and therefore in the preferred embodiment of this invention, a water-soluble polyvinyl alcohol is employed in producing the novel polymeric esters of this invention. Of the water-soluble polyvinyl alcohols, those having viscosities (4% water solution) ranging from 5 to 70 centipoises at 20° C. and preferably ranging from 20 to 50 centipoises at 20° C. are more suitable for the preparation of the novel products of this invention.

Suitable acylating agents containing an oxocarbonyl in the acyl residue, which can be used for acylating the polyvinyl alcohols, are the 1-butene-1,3-diones of the general formula:

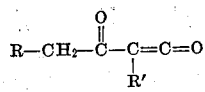

wherein R and R' are hydrogen or hydrocarbon radicals which may be aliphatic or aromatic. Examples of 1-butene-1,3-diones are 1-butene-1,3-dione, 2,4-dimethyl-1-butene-1,3-dione, 2,4-diisopropyl-1-butene-1,3-dione, 2,4-di-n-butyl-1-butene-1,3-dione, 2-n-butyl-4-methyl-1-butene-1,3-dione, 4-n-butyl-2-methyl-1-butene-1,3-dione, 2-n-hexyl-4-methyl-1-butene-1,3-dione, 4-n-hexyl-2-methyl-1-butene-1,3-dione, 4-n-decyl-1-butene-1,3-dione, 2,4-di-n-hexyl-1-butene-1,3-dione, 2,4-di-n-decyl-1-butene-1,3-dione, 2,4-di-hexadecyl-1-butene-1,3-dione, 2,4-di-phenyl-1-butene-1,3-dione, 2,4-di-(7,8-hexadecenyl)-1-butene-1,3-dione.

The novel products of this invention, obtained by acylating a polyvinyl alcohol with a 1-butene-1,3-dione, are esters of a polyvinyl alcohol with a β-keto acid. The structure of the products can be illustrated by the general formula of the reaction product obtained by acylating completely hydrolyzed polyvinyl alcohol with 1-butene-1,3-dione:

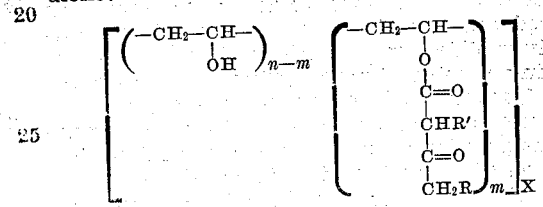

wherein R and R' are hydrogen or hydrocarbon radicals which may be either aliphatic or aromatic; n, m and X are integers and m is equal to or less than n.

I have found that a polyvinyl alcohol can be conveniently acylated with a 1-butene-1,3-dione by heating a mixture of said reactants dissolved in a suitable inert solvent (that is, one which will not react preferentially with the 1-butene-1,3-dione) at a temperature ranging from 60–175° C. and preferably within the range of 100–150° C. The reaction should be carried out under substantially anhydrous conditions in order to avoid wastage of the 1-butene-1,3-dione. Examples of such suitable solvents include amides of monocarboxylic acids in which the carboxylic acid residue contains not more than 6 carbon atoms. The amides may be acyclic or cyclic and include formamide, methyl formamide, dimethyl formamide, ethylformamide, diethylformamide, dibutylmide, ethylformamide, acetamide, dimethylacetamide, propionamide, butyramide, γ-butyrolactam, Δ-valerolactam, caprolactam and 2-morpholone.

The relative proportions of the reactants employed may be varied widely depending upon the degree of acylation desired. In general, amounts of 1-butene-1,3-dione are employed so that from 5% to 100% of the available hydroxyl groups in the polyvinyl alcohol are acylated. If it is desired to completely acylate all of the hydroxyl groups present in the polyvinyl alcohol, a stoichiometric excess of the acylating agent is generally employed. If water-soluble products are desired, the amount of acylating agent employed is varied from about 5% to about 40% of the theoretical, depending upon the viscosity and the water solubility of the polyvinyl alcohol to be reacted. Thus, low viscosity polyvinyl alcohols (i. e. those having a viscosity [4% water solution] of less than 15 centipoises) can be acylated to the extent that about 40% of the available hydroxyl groups are esterified to obtain water-soluble products, whereas polyvinyl alcohols having viscosities ranging from 15 to 30 and above 40 centipoises can be acylated respectively to about 30% and to about 10% to yield water-soluble products. The products obtained by acylating water-soluble polyvinyl alcohols having viscosities ranging from 15 to 30 centipoises at 20° C., to the extent where from 4.5 to 10% of the available hydroxyl groups are acylated with a $\beta$-keto acid have been found to be particularly valuable since they are capable of forming thermo-reversible gels when heated with a gelling agent such as adipodihydrazide, as described in my co-pending application Serial No. 745,651, filed on even date herewith.

While certain of the acylated polyvinyl alcohols obtained in accordance with the present invention are of particular value for use in the production of gelatin substitutes, it will be understood that valuable products are obtained when any polyvinyl alcohol is acylated with a 1-butene-1,3-dione so that from 5% to 100% of the available hydroxyl groups in the polyvinyl alcohol are acylated. The acetoacetic acid ester group thus introduced into the polyvinyl alcohol substantially modifies its properties and renders it useful in a number of novel applications. Thus, the novel resins produced in accordance with the present invention are capable of serving as non-diffusing color coupling components in the formation of azomethine dyes in certain color photographic processes. The novel resins, particularly those in which a relatively high proportion of the available hydroxyl groups of a polyvinyl alcohol are acylated, can also be cast or molded and possess physical properties generally similar to those of polyvinyl acetate, for example.

In order to illustrate the details of the present invention, the following specific examples of preferred embodiments thereof are given. The parts are by weight.

EXAMPLE 1

To a solution of 300 parts of completely hydrolyzed polyvinyl alcohol having a viscosity (4% water solution) of 24 centipoises at 20° C., dissolved in 2700 parts of anhydrous dimethyl formamide, was added slowly, with stirring, 108 parts of diketene dissolved in 2700 parts of anhydrous dimethyl formamide while maintaining the temperature at 120° C. during the course of 1½ hours. After the addition of the diketene was complete, the product was precipitated by pouring the hot solution into 6400 parts of methanol. After drying, there was obtained 335 parts of the partial acetoacetic acid ester of polyvinyl alcohol in which 18.9% of the theoretical hydroxyl groups were acylated.

Preparation of a photographic emulsion

The following solutions were prepared.

*Solution 1.*—100 parts of distilled water, 14 parts of potassium bromide, 0.2 parts of potassium iodide, 0.4 parts of sodium chloride and 40 parts of a 10% water solution of the product obtained above.

*Solution 2.*—200 parts of water, 20 parts of silver nitrate, 20 parts of 29% ammonium hydroxide.

*Solution 3.*—460 parts of a 10% water solution of the product obtained above, 220 parts of a 10% water solution of citric acid.

*Solution 4.*—33 parts of a 2% solution of adipodihydrazide.

A photographic emulsion was prepared by adding, during the course of 15 minutes, solution 2 maintained at 40° C. to solution 1, also at 40° C. To solution 3 was added the mixture of solutions 1 and 2 and the resultant mixture stirred for 4 minutes, after which solution 4 was added. The pH of the resultant emulsion was 4.7 and gelation took place in about 2.5 minutes. After chilling, the emulsion was washed for 1½ hours with distilled water. The emulsion became fluid when heated to approximately 55–60° C. and was coated onto photographic paper at 65° C.

The coated paper obtained was exposed to a negative photographic image and developed, using standard photographic procedures. There was thus obtained a photographic print exhibiting clear highlight portions, good gradation and deep black in the shadow portions of the image and having speeds equal to or slightly greater than that of standard soft photographic contact printing, developing out paper. The finished print, upon immersion in boiling water for 5 minutes, showed no deleterious results.

EXAMPLE 2

One hundred fifty parts of polyvinyl alcohol, having a viscosity of 24 centipoises at 20° C. (4% water solution) was dissolved in 1350 parts of dimethyl formamide by heating at 140° C. To this solution was added, with stirring, 80 parts of diketene dissolved in 80 parts of dimethyl formamide while maintaining the solution at 140° C. The hot solution was precipitated by slowly pouring it into 3600 parts of rapidly agitated methanol. After drying, there was obtained a good yield of the partial acetoacetic acid ester of polyvinyl alcohol in which 10% of the available hydroxyl groups were acylated. The partial ester was dissolved in 1500 parts of water to form a clear, viscous solution. The pH of 5% aqueous solutions of the ester was adjusted by addition of 25% citric acid solutions. To 25-gram portions of these 5% aqueous solutions of the polymer was added 1-gram portions of a 2% adipodihydrazide solution. The variation of melting points and gelling points of the resultant emulsions are shown in the following table.

| pH | Melting Point | Gelling Point |
|---|---|---|
|  | ° C. | ° C. |
| 2.5 | 50 | 35 |
| 3.0 | 55 | 45 |
| 4.0 | 65 | 48 |
| 5.0 | 70 | 46 |
| 6.0 | 74 | 55 |

Silver halide emulsions were prepared and coated on paper in the manner described in Example 1. Contact prints prepared from the sensitized paper using conventional photographic procedures possessed good gradation and clear highlights.

Polyvinyl alcohols acylated with 1-butene-1,3-diones are also useful as textile finishing agents. A 100-part portion of a 10% water solution of a completely hydrolyzed polyvinyl alcohol (viscosity of a 4% water solution, at 25 centipoises at 20° C.) which had been acylated to the extent that 16.2% of the available hydroxyl groups had been esterified with 1-butene-1,3-dione were mixed with 100-part portions of aqueous formaldehyde solutions containing 10, 15 and 20% of formaldehyde respectively. The pH of the resultant mixtures was adjusted to 3.8, the solutions were padded on cotton muslin and the padded cloth dried at 150° C. The fabric so obtained possessed good creaseproofing properties, exhibited a good hand and a desirable stiffness. The treated fabrics retained to a large degree the finish after five washings with aqueous soap solutions at 205° F. of one hour duration each.

EXAMPLE 3

To a solution of 150 parts of completely hydrolyzed polyvinyl alcohol having a viscosity (4% water solution) of 51 centipoises at 20° C., dissolved in 1350 parts of anhydrous dimethyl formamide was added slowly during the course of 15 minutes, with stirring, 18 parts of diketene dissolved in 18 parts of anhydrous dimethyl formamide while maintaining the temperature at 140° C. After the addition of the diketene was complete, the product was precipitated by pouring the hot solution into 3500 parts of dry benzene. After drying, the yellow fibrous partial acetoacetic acid ester of polyvinyl alcohol, in which 6.8% of the theoretical hydroxyl groups were acylated, was re-dissolved, with stirring and heating, to 100° C. in 1400 parts of water to form a highly viscous solution. Twenty-five-part portions of a 5% aqueous solution of the partial ester were adjusted to various pH's by the addition of 25% citric acid solutions. One-part portions of a gelling agent consisting of a solution of 2% adipodihydrazide in water acidified with a small amount of acetic acid were added to the modified polyvinyl alcohol obtained above to obtain gelation of product. The variations of the melting point and gelation point with pH are shown in the following table.

| pH | Melting Point | Gelation Point |
|---|---|---|
|  | °C. |  |
| 2.5 | 43 | 36° C. soft gel. |
| 3.0 | 51 | 44° C. soft gel. |
| 4.0 | 57 | 46° C. fairly stiff gel. |
| 5.0 | >80 |  |

In a similar experiment in which 7.6% of the available hydroxyl groups in polyvinyl alcohol, having a viscosity (4% water solution) of 25 centipoises at 20° C., had been reacted with diketene and subsequently treated with adipodihydrazide as indicated above, the variation of the melting point and gelation point with pH are shown in the following table.

| pH | Melting Point | Gelation Point |
|---|---|---|
|  | °C. |  |
| 2.5 | 46 | 25° C. soft gel. |
| 3.0 | 58 | 45° C. soft gel. |
| 4.0 | 66 | 58° C. soft gel |
| 5.0 | >75 |  |

EXAMPLE 4

One hundred fifty parts of a low viscosity partially hydrolyzed polyvinyl acetate (4% aqueous solution, 4 centipoises at 20° C.) in which 53% of the acetate radicals are hydrolyzed to hydroxyl, dissolved in 1350 parts of anhydrous dimethyl formamide were acylated by treatment at 130° C. with 75 parts of diketene dissolved in 75 parts of dimethyl formamide using the general procedure described in Example 1. The partial acetoacetic acid ester of polyvinyl alcohol obtained was precipitated from the dimethyl formamide solution by pouring into absolute ether. The resultant product is valuable as a creaseproofing agent for textiles.

EXAMPLE 5

To a solution of 150 parts of partially hydrolyzed polyvinyl acetate (87% hydrolyzed) (viscosity of a 4% water solution—22 centipoises at 20° C.) dissolved in 1350 parts of anhydrous dimethyl formamide was added, with stirring, 25 parts of diketene dissolved in 25 parts of dimethyl formamide during the course of ½ hour while maintaining the temperature of the reaction mixture at 130° C. The polymeric product was precipitated by pouring the hot solution into 3500 parts of the diethyl ether of diethylene glycol. The yellow fibrous material was removed by filtration and dried. Analysis indicated that 10.8% of the remaining free hydroxyl groups had been converted to acetoacetic acid ester groups. The polymer was dissolved in 1500 parts of water by gentle heating. The variation of the melting point and gelling point of 5% water solutions, after treatment with adipodihydrazide as indicated in Example 2, with changes in pH were as follows:

| pH | Melting Point | Gelling Point |
|---|---|---|
|  | °C. | °C. |
| 2.5 | 55 | 40 |
| 3.0 | 58 | 47 |
| 4.0 | 64 | 52 |
| 5.0 | 71 | 55 |
| 6.0 | 76 | 55 |

In the appended claims the recited viscosities of the polyvinyl alcohol are those determined with a 4% water solution of the polyvinyl alcohol at 20° C.

I claim:

1. Partial acetoacetic acid esters of water-soluble polyvinyl alcohol, whose 4% water solution has a viscosity of from 15–30 centipoises at 20° C. and in which from 4.5 to 10% of the available hydroxyl groups are esterified with acetoacetic acid.

2. The method of producing water-soluble acetoacetic acid esters of polyvinyl alcohol which comprises acylating with diketene at least 4.5% of the available hydroxyl groups of a water-soluble polyvinyl alcohol whose viscosity is no more than 40 centipoises, the maximum amount of such hydroxyl groups acylated varying from about 40% when said viscosity is 15 centipoises to about 10% when said viscosity is 40 centipoises, the acylation reaction being conducted under substantially anhydrous conditions in the presence of an inert solvent and at a temperature of from 60 to 75° C.

3. The method as defined in claim 2 wherein the inert solvent employed is a liquid amide of an aliphatic monocarboxylic acid containing from 1 to 6 carbon atoms.

4. Water soluble partial acetoacetic acid esters of polyvinyl alcohol obtained by the process as defined in claim 2.

GIFFIN D. JONES.

REFERENCES CITED

The following references are of record in the file of this patent:

UNITED STATES PATENTS

| Number | Name | Date |
|---|---|---|
| 1,672,156 | Hermann | June 5, 1938 |
| 2,284,896 | Hanford | June 2, 1942 |
| 2,310,943 | Dorough | Feb. 16, 1943 |
| 2,326,006 | Bruson | Aug. 3, 1943 |

FOREIGN PATENTS

| Number | Country | Date |
|---|---|---|
| 847,912 | France | Oct. 19, 1939 |

OTHER REFERENCES

Jones: British Plastics, 16, pp. 122–9, especially page 124 (1944).

Lucas: "Organic Chemistry," page 200, American Book Co. (1935).